United States Patent
Ueno et al.

(10) Patent No.: US 9,181,986 B2
(45) Date of Patent: Nov. 10, 2015

(54) CONSTANT VELOCITY UNIVERSAL JOINT

(71) Applicant: NTN CORPORATION, Osaka (JP)

(72) Inventors: Tsuyoshi Ueno, Shizuoka (JP);
Masahide Miyata, Shizuoka (JP);
Shinichi Takabe, Shizuoka (JP); Mika Kohara, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/385,147

(22) PCT Filed: Mar. 8, 2013

(86) PCT No.: PCT/JP2013/056415
§ 371 (c)(1),
(2) Date: Sep. 12, 2014

(87) PCT Pub. No.: WO2013/137128
PCT Pub. Date: Sep. 19, 2013

(65) Prior Publication Data
US 2015/0038601 A1 Feb. 5, 2015

(30) Foreign Application Priority Data
Mar. 14, 2012 (JP) .................. 2012-056728

(51) Int. Cl.
*F16D 3/18* (2006.01)
*F16J 3/04* (2006.01)
*F16D 3/84* (2006.01)
(Continued)

(52) U.S. Cl.
CPC ... *F16D 3/18* (2013.01); *C08K 3/22* (2013.01); *F16D 3/845* (2013.01); *F16J 3/041* (2013.01); *F16J 3/043* (2013.01); *F16J 15/52* (2013.01); *C08K 2003/2241* (2013.01);
(Continued)

(58) Field of Classification Search
None
See application file for complete search history.

(56) References Cited

U.S. PATENT DOCUMENTS 3,919,161 A * 11/1975 Glaister et al. .................. 524/14
4,074,001 A 2/1978 Imai
(Continued)

FOREIGN PATENT DOCUMENTS

JP 52-002439 A 1/1977
JP 05-52360 U 7/1993
(Continued)

OTHER PUBLICATIONS

International Search Report (in corresponding PCT application) dated Jun. 11, 2013.

*Primary Examiner* — Robert S Loewe
(74) *Attorney, Agent, or Firm* — Hedman & Costigan, P.C.; James V. Costigan; Kathleen A. Costigan

(57) ABSTRACT

There is provided a constant velocity universal joint having excellent durability at high temperature while using a boot made of silicone rubber that does not include cerium oxide or other rare earth element-containing compound. The constant velocity universal joint is provided with an outer joint member (2), an inner joint member (4), a shaft (8) coupled to the inner joint member (4), and a boot (9) mounted directly or via another member to the outer joint member (2) and the shaft (8), the boot (9) being a molded article of a silicone rubber composition including silicone rubber, iron oxide, and titanium oxide and not including a rare earth element-containing compound. The silicone rubber composition furthermore includes barium zirconate as required.

10 Claims, 3 Drawing Sheets

(51) Int. Cl.
  *F16J 15/52*   (2006.01)
  *C08K 3/22*    (2006.01)
  *F16D 3/205*       (2006.01)
  *F16D 3/223*       (2011.01)

(52) U.S. Cl.
  CPC ........ *C08K 2003/2272* (2013.01); *F16D 3/205* (2013.01); *F16D 3/223* (2013.01)

(56) References Cited

U.S. PATENT DOCUMENTS

| | | | |
|---|---|---|---|
| 5,179,148 A * | 1/1993 | Inoue et al. | 524/265 |
| 6,232,379 B1 * | 5/2001 | Takita | 524/266 |
| 7,297,065 B2 * | 11/2007 | Wang | 464/173 |
| 2001/0016563 A1 * | 8/2001 | Takabe | 508/364 |
| 2004/0017046 A1 * | 1/2004 | Frazer et al. | 277/391 |
| 2007/0298890 A1 * | 12/2007 | Momiyama et al. | 464/147 |
| 2008/0132341 A1 * | 6/2008 | Momiyama et al. | 464/175 |
| 2013/0276563 A1 * | 10/2013 | Kawamura et al. | 74/89.44 |

FOREIGN PATENT DOCUMENTS

| | | |
|---|---|---|
| JP | 2572621 Y2 | 5/1998 |
| JP | 10-158518 A | 6/1998 |
| JP | 2001-348481 A | 12/2001 |
| JP | 2005-214395 A | 8/2005 |
| JP | 2007-321923 A | 12/2007 |
| JP | 2009-019129 A | 1/2009 |
| JP | 2010-078149 A | 4/2010 |
| WO | 2010/024434 A1 | 3/2010 |

* cited by examiner

CONSTANT VELOCITY UNIVERSAL JOINT

TECHNICAL FIELD

The present invention relates to a constant velocity universal joint, and particularly relates to a constant velocity universal joint that uses a boot made of silicone rubber.

BACKGROUND ART

The usage conditions of a constant velocity universal joint are tending to be more severe in accompaniment with higher vehicle performance in recent years. The amount of heat generated by the constant velocity universal joint is trending upward due to the requirements of higher torque and high-rotation usage conditions. Also, the effect of radiant heat in a constant velocity universal joint for a drive shaft equipped on the differential gear side and a constant velocity universal joint for a propeller shaft is also trending upward due to layouts in which the distance from an exhaust pipe is reduced due space-saving measures. As a result, a boot mounted on the constant velocity universal joint is exposed to higher temperatures (e.g., 140° or higher).

Accordingly, in the particular case of a constant velocity universal joint that requires high heat resistance, there is a need to use a boot for a constant velocity universal joint made of silicone rubber, which is formed from a silicone rubber having excellent heat resistance (see Patent Document 1). The use of silicone rubber as a material is at the same time also excellent for low-temperature characteristics (e.g., −40° C. or lower). Also, cerium oxide, which is a compound containing a rare earth (a rare earth element), is sometimes included in the silicone rubber in order to further improve durability of the boot for a constant velocity universal joint at high temperatures.

PRIOR ART DOCUMENT

Patent Document

Patent Document 1: Japanese Laid-Open Patent Publication No. 2005-214395

SUMMARY OF THE INVENTION

Problems to be Solved by the Invention

Fatigue cracks readily occur in curved portions due to repeated stress being applied in accompaniment with deformation from the usage environment of the boot for a constant velocity universal joint. In the particular case that a silicone rubber is used as a material, cracks are liable to worsen once a crack has occurred. Such cracks readily occur when there is exposure to high temperature. As described above, adding cerium oxide to the silicone rubber can provide an effective countermeasure for preventing the occurrence of cracks, even under severe high-temperature conditions of 140° C. or higher.

However, production sites for cerium oxide are limited, availability is therefore unstable, costs may readily soar, stable supply is uncertain, and obstacles may arise in the use of cerium oxide in a boot material. Accordingly, there is a need improve the durability of a boot at high temperatures, specifically, to prevent the occurrence of the above-described cracks when a boot is used in a high-temperature environment (e.g., 140° C. or higher), without the use of a cerium oxide-containing compound or other rare earth element-containing compound in a boot material.

The present invention was devised in order to solve such problems, and an object of the present invention is to provide a constant velocity universal joint having excellent durability at high temperature while using a boot made of silicone rubber that does not contain a cerium oxide-containing compound or other rare earth element-containing compound.

Means for Solving the Problem

The constant universal velocity joint of the present invention is provided with an outer joint member, an inner joint member, a shaft coupled to the inside joint member, and a boot mounted directly or via a separate member to the outside joint member and the shaft, the constant velocity universal joint being characterized in that the boot is a molded article of a silicone rubber composition including silicone rubber, iron oxide, and titanium oxide and not including a rare earth element-containing compound. Rare earth elements are 17 elements consisting of scandium, yttrium, and the lanthanoid elements (lanthanum-ruthenium).

The silicone rubber composition is characterized in including barium zirconate. Also, the silicone rubber composition is characterized in including 0.5 to 5 parts by weight of the iron oxide, the titanium oxide, and the barium zirconate, respectively, with respect to 100 parts by weight of the silicone rubber.

The constant velocity universal joint described above is characterized in that grease is enclosed in the space sealed by the boot.

The boot is characterized in being composed of a large end side attaching section secured to the outer joint member, a small end side attaching section secured to the shaft, and a bellows having a plurality of peaks and roots disposed between the two attaching sections, the boot having a shape in which the bend of the external peripheral surface of the trough part of the bellows is less than the bend of the peak. The constant velocity universal joint is characterized in being a sliding constant velocity universal joint and being used in a drive shaft for an automobile.

The boot is characterized in being composed of a large end side attaching section secured to an end part of an annular member coupled to the outer joint member, a small end side attaching section secured to the shaft, and bellows having a bending part curved in a U-shape provided between the two attaching sections. The constant velocity universal joint is characterized in being a sliding constant velocity universal joint and being used in a propeller shaft for an automobile.

Effect of the Invention

In the constant velocity universal joint of the present invention, the boot to be mounted is a molded article having a silicone rubber composition including silicone rubber, iron oxide, and titanium oxide, yet not including a rare earth element-containing compound, and therefore has about the same high-temperature durability as when cerium oxide is included while using a filler that can generally be readily and stably acquired at relatively low cost. Specifically, the occurrence of cracks in the accordion trough part or the like can be inhibited in an operating test under a high-temperature atmosphere of 140° C. or higher. Accordingly, the constant velocity universal joint in which this boot has been mounted is low cost and has excellent durability at high temperatures.

Furthermore, adding barium zirconate to the silicone rubber composition makes it possible to improve even higher temperature durability.

A boot provided with a bellows having plurality of peaks and roots has a shape in which the bend of the external peripheral surface of the root of the bellows is less than the bend of the peak, thereby making it possible to inhibit deformation in the compression-side phase of the boot root which is most readily affected when the constant velocity universal joint has assumed an operating angle, and making it possible to further improve the high-temperature durability of the boot.

Using a boot provided with a bellows part having a bending part curved in a U-shape makes it possible to form the bending part in a large rounded shape, to inhibit whipping of the boot bended part when the constant velocity universal joint has rotated at high speed, and to further improve the high-temperature durability of the boot.

MODE FOR CARRYING OUT THE INVENTION

Figure 1:
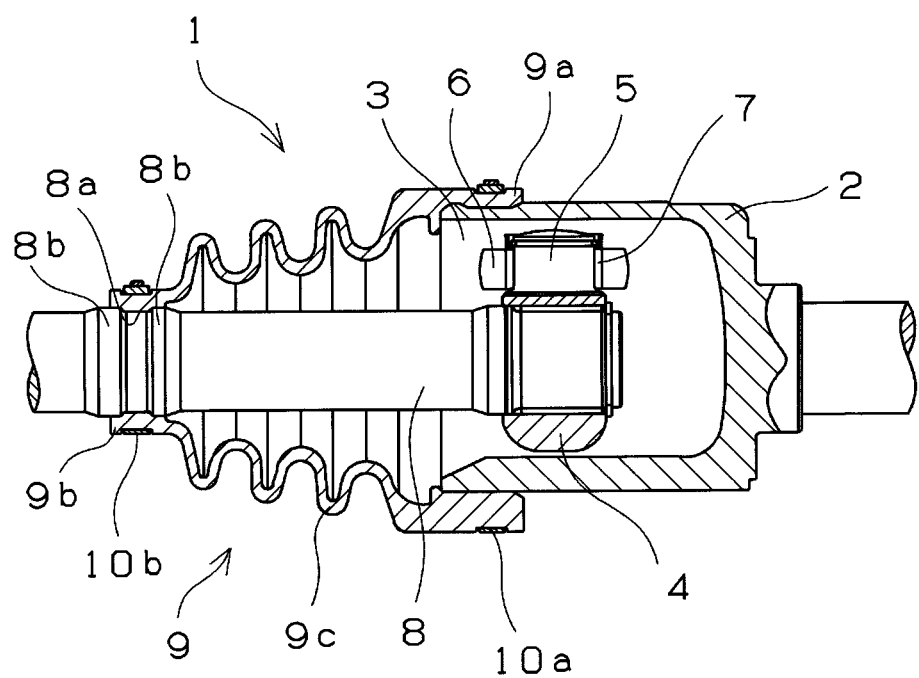
FIG. 1 is a partial cross-sectional view showing a first embodiment of the constant velocity universal joint according to the present invention.

The constant velocity universal joint of the present invention improves durability at high temperature while using a boot made of silicone rubber that does not include cerium oxide or other rare earth element-containing compound. Specifically, improving the material and structural aspects of the boot improves the durability of a boot at high temperature, and as a result, allows the durability of a constant velocity universal joint to be improved. The "durability of a boot" in the present invention refers to wearability due to bending fatigue and interference that accompany boot deformation, and "excellent durability at high temperature" refers to the ability to prevent boot damage caused by bending fatigue and wear when used in a high-temperature environment (e.g., 140° C. or higher).

The silicone rubber composition for forming the boot of the constant velocity universal joint of the present invention is a composition in which iron oxide and titanium oxide have been added to silicone rubber. A silicone rubber composition is generally obtained by adding a cross linking agent, a silica filler, a processing aid, a filler for improving characteristics, and the like to silicone rubber (crude rubber), and these are also added to the silicone rubber composition of the present invention as required. In the present invention, the filler has a characteristic of being added in combination with iron oxide and titanium oxide in particular.

The silicone rubber used in the present invention is a polyorganosiloxane with a high degree of polymerization having a siloxane bond (Si—O bond), and may have rubber-like elasticity at room temperature. A millable silicone rubber or a liquid silicone rubber may be used as the silicone rubber. An additive-type liquid silicone rubber or a condensation-type liquid silicone rubber may be used as the liquid silicone rubber. A millable silicone rubber is preferably used in that a straight-chain polyorganosiloxane with a high degree of polymerization is used as the main material and can be handled in the same manner as natural rubber or the like.

It is also possible to used a dimethyl silicone rubber (MQ), a methyl-vinyl silicone rubber (VMQ), a methyl-phenyl-vinyl silicone rubber (PVMQ), or a methyl-fluoroalkyl silicone rubber (FVMQ). Among these, a methyl-vinyl silicone rubber (VMQ) is preferably used for its low compression set, excellent heat resistance, and tearing strength.

In silicone rubber for general applications (excluding constant velocity universal joints), iron oxide, titanium oxide, cerium compounds, manganese compounds, nickel compounds, tungsten compounds, and other metal compounds and metal organic salts are known as improvers capable of improving heat resistance and flame resistance, and are in actuality added for such purposes. The reason that heat resistance is thought to be improved is that oxidation of organic groups is prevented by radical scavenging of transition metals, polymer bridging by bonding with a silanol group is prevented, as well as other factors. These effects differ considerably depending on the metal species, and, e.g., cerium oxide or other cerium compounds can improve heat resistance (hardness, tensile strength, elongation, and the like) to the same extent, even when used in very small amounts in comparison with iron oxide.

On the other hand, the constant velocity universal joint rotates at high speed while assuming an operating angle and rotates while sliding in the axial direction in a sliding-type arrangement, and the boot repeatedly deforms following behavior thereof. In doing so, the peaks of the bellows, the roots of the bellows, and the shaft interfere with each other, and repetitive stress is applied to the peaks and roots. Accordingly, the boot requires excellent wear resistance to interference, and characteristics such as the capability of preventing the occurrence of fatigue cracks against repetitive stress. In a boot made of silicone rubber for a constant velocity universal joint, metal compounds and other additives must be selected with consideration given to actual properties that cannot be determined for compatibility solely from general tensile strength, elongation, and the like. Conventionally, cerium oxide is added as a metal compound to a boot made of silicone rubber of a constant velocity universal joint in consideration of these factors.

In contrast to the above, the silicone rubber composition for forming the boot of the constant velocity universal joint of the present invention features the dual use of "iron oxide" and "titanium oxide" without the addition of cerium oxide or other rare earth element-containing compound. It is not possible to satisfy high-temperature durability required in a boot by adding only one of iron oxide and titanium oxide without the addition of cerium oxide or other rare earth element-containing compound. However, adding both iron oxide and titanium oxide increases high-temperature durability in a boot and allows performance required in a boot to be maintained.

Diiron trioxide ($Fe_2O_3$: Bengara red), triiron tetraoxide ($Fe_3O_4$: Bengara black), or other substances in which a portion of the iron atoms have been substituted by zinc, magnesium, or the like can be used as the iron oxide. A mixture of these may also be used.

A rutile-type, anatase-type, or a mixed crystal-type titanium oxide ($TiO_2$) may be used as the titanium oxide. The titanium oxide may be obtained by a sulfuric acid method, a chlorine method, or the like.

Iron oxide and titanium oxide are each added to the silicone rubber in the form of particles (powder). The shape of the particles may be spherical, pectinate, rhombic, or an indeterminate form. The surface of the particles may be surface-treated by a surface treatment agent.

Barium zirconate is preferably added in addition to the iron oxide and the titanium oxide to the silicone rubber composition for forming the boot of the constant velocity universal joint of the present invention. Furthermore, using barium zirconate rather than iron oxide and titanium oxide alone allows high-temperature durability to be maintained even when the addition amount of each and the total addition amount of these components is low. Reducing the total addition amount makes it possible to inhibit degradation of the basic performance of rubber caused by an increase in foreign matter in the silicone rubber.

When barium zirconate is not used in combination, the addition amount of iron oxide and titanium oxide with respect to silicone rubber is preferably three to five parts by weight, respectively, with respect to 100 parts by weight of the silicone rubber. In this case, when the addition amount is less than three parts by weight, it may not be possible to sufficiently improve high-temperature durability. Also, when the addition amount exceeds five parts by weight, the addition is excessive and the basic performance of rubber is liable to be degraded.

On the other hand, when barium zirconate is used in combination, the addition amount is preferably 0.5 to 5 parts by weight, respectively, with respect to 100 parts by weight of the silicone rubber. In this case as well, when the addition amount of the iron oxide and the titanium oxide is less than 0.5 parts by weight, respectively, it may not be possible to sufficiently improve high-temperature durability. The addition amount is more preferably one to four parts by weight, is even more preferably one to three parts by weight, and is most preferably one to two parts by weight.

The addition amount of barium zirconate with respect to the silicone rubber can be suitably determined in consideration of the addition amount of iron oxide and titanium oxide, and is preferably 0.5 to 5 parts by weight with respect to 100 parts by weight of the silicone rubber. When the addition amount is less than 0.5 parts by weight, it becomes difficult to obtain an effect for improving high-temperature durability due to the combined use of barium zirconate with iron oxide and titanium oxide. Also, when the addition amount exceeds five parts by weight, the addition is excessive and the basic performance of rubber is liable to be degraded. The addition amount may be the same as iron oxide and titanium oxide, is preferably one to four parts by weight, is more preferably one to three parts by weight, and is most preferably one to two parts by weight.

As described in the examples, particularly excellent effect is obtained when barium zirconate is added in addition to iron oxide and titanium oxide, and the addition amount of each is two to four parts by weight with respect to 100 parts by weight of the silicone rubber.

Other components (cross linking agent, silica-based filler, processing aid, and the like) to be added to the silicone rubber composition for forming the boot of the constant velocity universal joint of the present invention are described below.

An organic peroxide cross linking agent or a SiH group-containing compound can be used as the cross linking agent. An organic peroxide cross linking agent is used in organic peroxide curing-type silicone rubbers and is used as a catalyst for promoting the cross-linking reaction of polyorganosiloxane. Examples of the organic peroxide cross linking agent that may be used include: 2,4-dichlorobenzoyl peroxide, benzoyl peroxide, p-dichlorobenzoyl peroxide, and other acyl peroxides; and dicumyl peroxide, 2,5-dimethyl-2,5-di(t-butyl peroxy)hexane, di(t-butyl)peroxide, t-butylcumyl peroxide, and other alkyl peroxides. Such organic peroxide cross linking agents are used in the amount of about 0.1 to 5 parts by weight, and preferably 0.1 to 3 parts by weight with respect to 100 parts by weight of the silicone rubber.

On the other hand, a SiH group-containing compound is used in addition reaction-curable silicone rubbers. A polyorganosiloxane having a vinyl group at the terminal or side chain, and a SiH group-containing compound having three or more —SiH groups at the molecule terminal are made to undergo a hydrosilylation reaction, which is an addition reaction in the presence of a platinum-based catalyst, to achieve cross linking. The SiH group-containing compound is a relatively low molecular weight polymer, and about one to three mol chemical equivalent of the —SiH group is used per one mol chemical equivalent of the vinyl group of the polyorganosiloxane.

In the present invention, an organic peroxide cross linking agent (alkyls) is preferably used as the cross linking agent in a millable silicone rubber (VMQ, in particular) because it has excellent heat resistance, cold resistance, and mechanical strength temperature dependency, and also has excellent handling characteristics and the like.

Fine silica powder, diatomaceous earth, quartz powder, or the like may be used as the silica-based additive. The fine silica powder preferably has a large specific surface area, and examples that can be used include aerosol silica and precipitated silica. Improving dispersability of the silica-based filler makes it possible to improve tearing strength and also aids in preventing cracks at high temperatures. Accordingly, the silica surface is preferably silicone-treated in addition to the addition of a later-described processing aid.

Low-viscosity silicone oil/resin, silane compound, or the like having a silanol group or an alkoxyl group at the terminal may be used as the processing aid. These processing aids are added to facilitate dispersion of various fillers, to accelerate wetting of the filler and polymer, to improve flow characteristics, to improve physical properties, and to obtain other advantages.

Fillers for improving characteristics may be added to the silicone rubber composition in addition to iron oxide, titanium oxide, and barium zirconate for the purpose of enhancing mechanical strength and oil resistance, increasing quantity, and adjusting hardness. Examples of such fillers include alumina, talc, clay, calcium carbonate, magnesium carbonate, calcium sulfate, barium sulfate, magnesium silicate, aluminum hydroxide, synthetic zeolite, carbon black, glass powder, hydrotalcite, and the like. These may be used alone or in a combination of two or more.

A wear resistance improver may also be added in order to improve the wear resistance of the boot. Examples of such improvers that may be used include mineral oil, vegetable oil, a low-melting-point solid hydrocarbon, an aliphatic polyether compound, an aliphatic polyester compound, an aliphatic polylactone compound, a fatty acid amide compound, and a poly(alkylene oxide)glycol. These may be used alone or in a combination of two or more.

Various other additives may furthermore be added as required to the silicone rubber composition. Examples of such additives that may be used include plasticizers, antioxidants, cross linking promoters, cross linking retardants, pigments and dyes and other colorants, and the like.

The boot of the constant velocity universal joint of the present invention is a cured molded article having the silicone rubber composition described above, and is obtained by molded the silicone rubber composition into a predetermined boot shape using a molding method that conforms to the characteristics of the silicone rubber (millable, liquid, and the like). When a millable silicone rubber is used, the materials constituting the silicone rubber composition are kneaded using a Banbury mixer, a kneader, an open roller, or other ordinary rubber kneading machine, and are molded into a predetermined boot shape by heat compression molding or injection molding in the same manner as ordinary organic rubber. The molding temperature and time is determined in accordance with the type of cross linking agent, boot size, and the like. Also, when a liquid silicone rubber is used, cast molding, liquid-injection molding, and the like may be used.

Described next are the mechanical properties (JIS K6251-6253) of the boot of the constant velocity universal joint of the present invention. The hardness is preferably 58 to 72 in terms of durometer hardness (type A). The tensile strength is preferably 7 MPa or higher and more preferably 8 MPa or higher. The elongation at breakage is preferably 300% or more and more preferably 350% or more. The tearing strength is preferably 30 kN/m or higher and more preferably 38 kN/m or higher. These are the preferred ranges for withstanding deformation in the usage environment of the boot (deformation in accompaniment with operating angles), interference from flying pebbles and other foreign matter, and whipping (abnormal deformation) during high-speed rotation. When the hardness is excessively high, bending fatigue and crack propagation characteristics are liable to be degraded.

The constant velocity universal joint of the present invention is provided with an outer joint member, an inner joint member, a shaft coupled to the inner joint member, and a boot mounted directly or via a separate member to the outer joint member and the shaft, the constant velocity universal joint being provided with a boot which is a molded article composed of a silicone rubber composition.

Following are examples of structures other than the boot of the constant velocity universal joint of the present invention. The boot to be mounted must be capable of deforming so as to follow the behavior of the constant velocity universal joint when any structure is used, including those below.

(A) A structure provided with an outer joint member in which three rectilinear grooves extending in the axial direction are formed in an internal peripheral surface, a tripod member as an inner joint member having three journals protruding in the radial direction, and rollers as a rolling elements rotatably supported by the journals of the tripod member, wherein the roller is disposed so as to freely roll along the grooves of the outer joint member.

(B) A structure provided with an outer joint member in which a plurality of rectilinear grooves extending in the axial direction is formed in an cylindrical internal peripheral surface, an inner joint member in which a plurality of rectilinear grooves that form pairs with the grooves of the outer joint member is formed in a spherical external peripheral surface, balls (three to eight) as rolling elements disposed between the inner grooves of the outer joint member and the grooves of the inner joint member, and a cage for holding the balls between the outer joint member and the inner joint member.

(C) A structure provided with: an outer joint member in which a plurality of rectilinear grooves is formed in an internal peripheral surface; an inner joint member in which a plurality of rectilinear grooves that form pairs with the grooves of the outer joint member is formed in an external peripheral surface, and has a structure in which these grooves and the grooves of the outer joint member are sloped at a predetermined angle in mutually opposite directions with respect to the axial direction; balls (4, 6, 8, or 10) interposed in the intersecting part between the grooves of the outer joint member and the groves of the inner joint member; and a cage for holding the balls between the outer joint member and the inner joint member.

Figure 2:
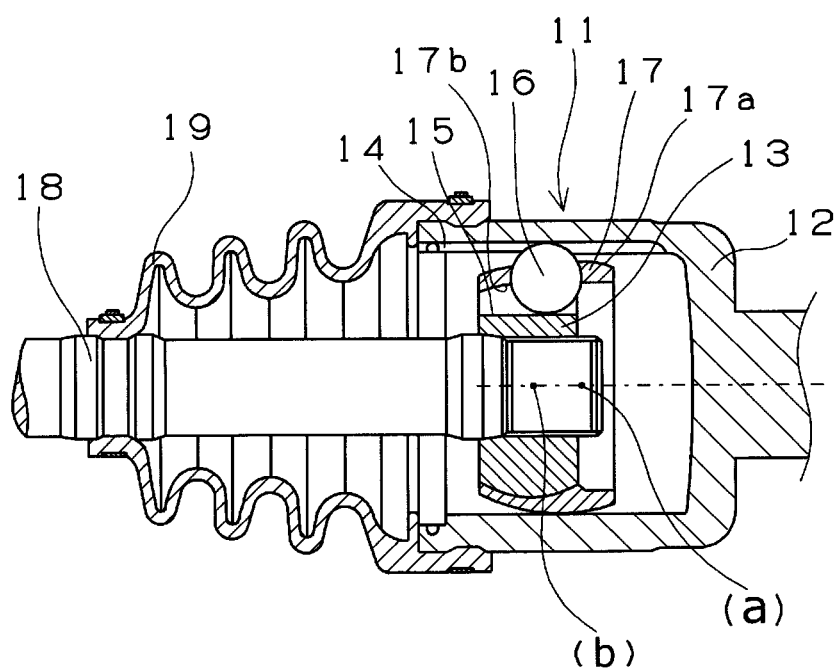
FIG. 2 is a partial cross-sectional view showing a second embodiment of the constant velocity universal joint according to the present invention.

Described next are first and second specific embodiments of the constant velocity universal joint of the present invention with reference to FIGS. 1 and 2. FIG. 1 shows a partial cross-sectional view of a tripod joint (hereinafter notated as TJ). FIG. 2 shows a partial cross-sectional view of a double offset joint (hereinafter notated as DOJ). These joints are sliding constant velocity universal joints and are used as the drive shaft for an automobile.

TJ 1 has three rectilinear grooves 3 in the axial direction formed on the inner surface of an outer joint member 2, as shown in FIG. 1. Three journals 5 incorporated inside the outer joint member 2 are provided to a tripod member (inner joint member) 4. A spherical rollers 6 are inserted outside the journals 5, a needle 7 is incorporated between the spherical rollers 6 and the journals 5 to rotatably and slidably support the spherical rollers 6 in the axial direction, and the spherical rollers 6 are inserted so as to allow free rolling in the grooves 3. A boot 9, which is a molded article composed of a silicone rubber composition, is mounted from the outer joint member 2 across to the shaft 8 coupled to the tripod member 4.

The boot 9 covers the constant velocity universal joint so as to enclose the constant velocity universal joint, the boot being provided with an outer tube end part (large end side attaching section) 9a fitted and secured to the outer joint member 2, an inner tube end part (small end side attaching section) 9b fitted and secured to the shaft 8 coupled to the inner joint member 4, and a bended part in the form of an accordion having a plurality of peaks and roots (may hereinafter also be referred to as "bellows") for connecting the space between the outer tube end part 9a and the inner tube end part 9b. Grease or another lubricant (not shown) is sealed inside the enclosed space. The outer tube end part 9a of the boot 9 is fitted and secured to the outer joint member 2 using a clamp 10a or the like, and the inner tube end part 9b is secured to the shaft 8 using a clamp 10b or the like. A boot groove 8a is formed in the external peripheral surface in the location where the inner tube end part 9b of the shaft 8 is to be secured, and the inner tube end part 9b is fitted into the boot groove 8a. An annular protruding part 8b is disposed on both sides of the boot groove 8a, whereby the securing of the inner tube end part 9b in the boot groove 8a to the shaft 8 can be made even stronger.

In a DOJ 11, a plurality of rectilinear grooves 14, 15 is formed in the axial direction on inner surface of the outer joint member 12 and the outer surface of the inner race (inner joint member) 13, as shown in FIG. 2. The ball 16 incorporated between the grooves 14, 15 are supported by a cage 17, a spherical surface 17a is the external periphery of the cage 17, and a spherical surface 17b conforming to the external periphery of the inner race 13 is the internal periphery of the cage. The centers (a) and (b) of the spherical surfaces 17a, 17b are offset in position in the axial direction in terms of the axial center of the outer joint member 12. A boot 19, which is a molded article composed of a silicone rubber composition, is mounted from the outer joint member 12 across to the shaft 18 coupled to the inner race 13. The structure of the boot 19 and the attaching structure thereof is the same as boot 9 in FIG. 1. Grease or another lubricant (not shown) is sealed inside the space enclosed by the boot 19.

In FIGS. 1 and 2, the bellows shape of the boots 9, 19 is such that the curvature of the external peripheral surface of the root of the bellows is less than the curvature of the peak. In other words, making the radius of the curvature of the root of bellows to be greater than the radius of the curvature of the peak inhibits deformation in the compression-side phase of the boot root when an operating angle is assumed, and improves the durability of the root. When the curvature of the external peripheral surface of the root is equal to or greater than the curvature of the external peripheral surface of the peak, the root is considerably compressed and the starting point of a crack is readily produced.

It is also possible to adopt a structure in which an arcuately formed connecting part smoothly continuous with the small end side attaching section and in which the external periphery has a center of curvature in the external part of the boot is disposed at the end part of the small end side attaching section side of the bellows, the radius of curvature of the external periphery of the connecting part is set so as to be greater than the radius of curvature of the external periphery of the peak of the bellows, and the thickness at any point of the connecting part is equal to or thicker than the thickness of the connecting part at the end part of the large end side attaching section side.

In the small end side attaching section, it is possible to use a structure provided with a shaft-mounting unit in which a fitting groove for mounting a clamp is formed on the outer diameter surface, and a thin part coupled to the bellows from the shaft-mounting part via a thick part, the thin part permitting displacement in the form of buckling with respect to the bellows and the shaft-mounting part.

It is possible to maintain excellent high-temperature durability in a constant velocity universal joint used in a drive shaft for an automobile in which a boot having a structure such as that described above is mounted, the boot being a molded article composed of a predetermined silicone rubber composition.

Figure 3:
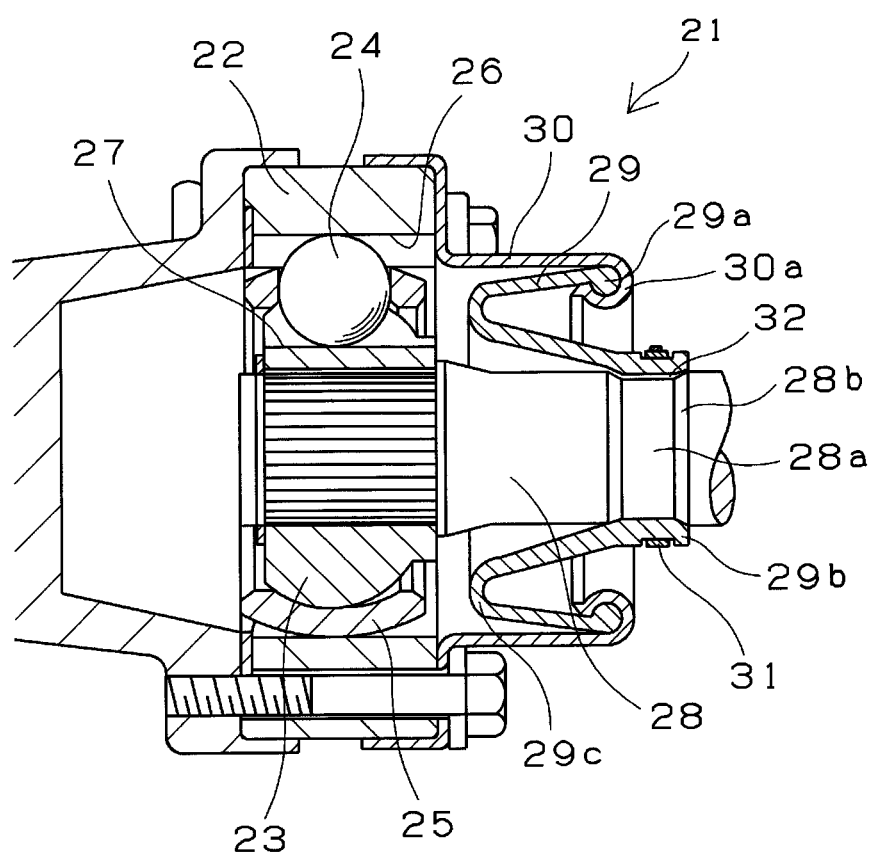
FIG. 3 is a partial cross-sectional view showing a third embodiment of the constant velocity universal joint according to the present invention.

Described next with reference to FIG. 3 is a third specific embodiment of the constant velocity universal joint of the present invention. FIG. 3 shows a partial cross-sectional view of a cross-groove joint (hereinafter notated as LJ). This is a sliding-type constant velocity universal joint and is used in a propeller shaft or the like for an automobile.

LJ 21 is provided with an inner joint member 23 in which a plurality of grooves 27 is formed in the external peripheral surface, and an outer joint member 22 positioned at the external periphery of the inner joint member 23 and in which the same number of grooves 26 as the grooves 27 of the inner joint member 23 is formed in the internal peripheral surface thereof, as shown in FIG. 3. The grooves 27 of the inner joint member 23 and the grooves 26 of the outer joint member 22 form angles sloped in opposite directions with respect to the axial line, and balls 24 are incorporated in the intersecting parts of the grooves 27 and grooves 26, which form pairs. A cage 25 is disposed between the inner joint member 23 and the outer joint member 22, and the balls 24 are held in a pocket of the cage 25.

The boot 29 is mounted between the outer joint member 22 and the shaft 28 coupled to the inner joint member 23 via an annular member 30 mounted on the outer joint member 22, and covers the constant velocity universal joint so as to enclose the constant velocity universal joint. Grease or another lubricant (not shown) is sealed inside the enclosed space. The boot 29 is provided with an outer tube end part (large end side attaching section) 29a secured to the end part of the annular member 30 mounted on the outer joint member 22, an inner tube end part (small end side attaching section) 29b secured to the shaft 28 coupled to the inner joint member 23, and a bellows part provided therebetween and having a bended part 29c curved in a U-shape. The bended part 29c curved greatly in a U-shape is provided to thereby inhibit whipping of the boot bended part when the LJ 21 has rotated at high speed and to improve the durability of the boot.

The outer tube end part 29a of the boot 29 is sealed by being secured to the annular member 30. An example of the securing method is to provide a recess 30a to the annular member 30 and to fit the distal end of the outer tube end part 29a of the boot 29 to the recess 30a and then crimp the recess 30a of the annular member 30, as shown in FIG. 3. This method for securing the outer tube end part 29a and the annular member 30 is an example, but no limitation is imposed thereby. For example, the outer tube end part 29a may be secured by a clamp 31 or the like to the annular member 30, or the annular member 30 may be integrally molded in advance with the boot 29 and mounted on the outer joint member 22. The reference numeral 32 in the drawing is a grove for venting air having a size that does not allow grease filled inside the boot to leak out. The annular member 30 is generally a metal ring made of iron, but may also be made of aluminum or another metal, or may be made of resin.

The inner tube end part 29b of the boot 29 is sealed by being secured to the shaft 28. A boot groove 28a is formed in the external peripheral surface in the location where the inner tube end part 29b of the shaft 28 is to be secured, and the inner tube end part 29b is fitted to the boot groove 28a and secured by a clamp or the like. An annular protruding part 28b is disposed on both sides of the boot groove 28a, whereby the securing of the inner tube end part 29b in the boot groove 28a to the shaft 28 can be made even stronger.

It is possible to maintain excellent high-temperature durability in a constant velocity universal joint used in a propeller shaft for an automobile in which a boot having a structure such as that described above is mounted, the boot being a molded article composed of a predetermined silicone rubber composition.

In another boot attaching structure, the large end side section and the small end side section of a boot are fitted over the outer joint member and the shaft coupled to the inside joint member, and boot clamps mounted in the fitting grooves formed in the large end side section and the small end side section contract in diameter to thereby secured the boot. In this configuration, it is possible avoid interference in that the boot clamp forms an annular body that does not have a folded-back part, the external peripheral surface part of the boot clamp in the axial direction forms a curved shape or folded shaped toward the outer diameter side, and in a diameter-contracted state of the boot clamp, a gap is formed between the external peripheral surface in the axial direction and the end part of the lower part of the fitting groove of the boot corresponding thereto.

The constant velocity universal joint of the present invention can be any mode, there is no limitation to being a sliding-type constant velocity universal joint provided with the above-described tripod, double offset, cross groove, or other mechanism for sliding in the axial direction of the outer joint member. It is also possible to use a Rzeppa-, Birfield-, or other non-sliding-type constant velocity universal joint in which balls are used. The tripod-type constant velocity universal joint may be a double roller-type or a single roller-type.

The grease enclosed in the constant velocity universal joint of the present invention is obtained by mixing additives with a base grease composed of a base oil and a thickener.

The base oil is not particularly limited, and it is possible to use base oils generally used as a base oil for grease for constant velocity universal joints. Examples include: naphthene, paraffin, liquid paraffin, hydrogenated dewaxed oil, and other mineral oils; polyalkylene glycol and other polyglycol oils; alkyl diphenyl ether, polyphenyl ether, and other ether-based synthetic oils; diester oil, polyolester oil, and other ester-based oils; polydimethyl siloxane, polyphenylmethyl siloxane, and other silicone oils; and GTL base oil, poly-α-olefin (hereinafter notated as PAO), and other hydrocarbon-based synthetic oils. These may be used alone or in a mixed oil of two or more types. Among these, a base oil containing naphthene, paraffin, or another mineral oil is preferred in consideration of its low cost and ease of commercial use. The use of a base oil containing ester oil, PAO oil, or another synthetic oil is preferred when consideration is given to lubrication performance and lubrication service life, and particularly preferred is a mixed oil of ester oil and PAO oil.

The mineral oil preferably has a kinematic viscosity of 40 mm$^2$/s or more and more preferably 40 to 350 mm$^2$/s at 40° C. in order to inhibit a reduction in lubricating performance. When the kinematic viscosity is less than 40 mm$^2$/s, an oil film is less likely to form during low-speed rotation. When the kinematic viscosity exceeds 350 mm$^2$/S (*1), low-temperature characteristics are worsened, flowability is worsened, and rapid oil supply characteristics to lubricating surfaces are degraded.

The thickener is not particularly limited, and it is also possible to use thickeners generally used in grease for constant velocity universal joints. Examples of thickeners that may be used include: metal soap, composite metal soap, and other soap-based thickeners; and bentonite, silica gel, urea compounds, urea/urethane compounds, and other non-soap thickeners. Examples of metal soap that may be used include sodium soap, calcium soap, aluminum soap, and lithium soap; and examples of urea compounds and urea/urethane compounds that may be used include diurea compounds, triurea compounds, tetraurea compounds, and other polyurea compounds, and diurethane compounds. Among these, urea compounds, and diurea compounds in particular are preferred for their excellent heat resistance, and excellent intervention and adhesion to sliding parts.

The urea compound is obtained by reacting a polyisocyanate component and a monoamine component. When a urea compound is to be used as the thickener, the polyisocyanate compound and the monoamine compound are reacted in a base oil to produced a base grease. Examples of the polyisocyanate compound that may be used include phenylene diisocyanate, tolylene diisocyanate, diphenyl diisocyanate, diphenyl methane diisocyanate, octadecane diisocyanate, decane diisocyanate, and hexane diisocyanate. Examples of the monoamine compound that may be used include an aliphatic monoamine, an alicyclic monoamine, and an aromatic monoamine. Examples of an aliphatic monoamine that may be used are hexylamine, octylamine, dodecylamine, hexadecylamine, octadecylamine, stearylamine, and oleyl amine. An example of an alicyclic monoamine that may be used is cyclohexylamine. Examples of an aromatic monoamine that may be used are aniline and p-toluidine.

Examples of additives that may be used include extreme-pressure agents, antioxidants, rust-preventive agents, oily agents, and other additives generally used in grease for constant velocity universal joints.

Adding an extreme-pressure agent makes it possible to improve load resistance and extreme-pressure characteristics. For example, the following compounds may be used. Examples of an organic metals that may be used as required include: molybdenum dithiocarbamate, molybdenum dithiophosphate, and other organic molybdenum compounds; zinc dithiocarbamate, zinc dithiophosphate, zinc phenate, and other organic zinc compounds; antimony dithiocarbamate, antimony dithiophosphate, and other organic antimony compounds; selenium dithiocarbamate, and other selenium compounds; bismuth naphthenate, bismuth dithiocarbamate, and other organic bismuth compounds; iron dithiocarbamate, iron octylate, and other organic iron compounds; copper dithiocarbamate, copper naphthenate, and other organic copper compounds; tin maleate, dibutyltin sulfide, and other organic tin compounds; and organosulfonates, phenates, and phosphonates of alkali metals and alkaline earth metals; and gold, silver, titanium and other organometallic compounds. Examples of sulfur compounds that may be used include dibenzyl disulfide and other sulfide or polysulfide compounds, sulfurized oils and fats, ashless carbamic acid compounds, and thiourea compounds or thiocarbanates. Examples of phosphoric acid-based extreme-pressure agents that may be used include: trioctyl phosphate, tricresyl phosphate, and other phosphate esters; acidic phosphate esters, zinc phosphate esters, acidic zinc phosphate esters, and other phosphate ester compounds. Other examples that may be used include: chlorinated paraffin, and other halogen-based extreme-pressure agents; and molybdenum disulfide, tungsten disulfide, graphite, polytetrafluoroethylene resin, antimony sulfide, boron nitride, and other solid lubricants. Among these extreme-pressure agents, dithiocarbamic acid compounds, and dithiophosphoric acid compounds, and other sulfur-based extreme-pressure agents can be advantageously used.

Examples of antioxidants that may be used include the following compounds: phenyl-1-naphthylamine, phenyl-2-naphthylamine, diphenyl-p-phenylene diamine, dipyridylamine, phenothiazine, N-methyl phenothiazine, N-ethyl phenothiazine, 3,7-dioctyl phenothiazine, p, p'-dioctyl diphenylamine, N,N'-diisopropyl-p-phenylene diamine, N,N'-di-sec-butyl-p-phenylene diamine, and other amine compounds; 2,6-di-tert-dibutylphenol, and other phenol compounds; and the like.

Examples of the rust-preventive agent that may be used include the following compounds: ammonium salt of organic sulfonic acid; barium, zinc, calcium, magnesium, and other alkali metals or alkaline earth metals of organic sulfonic acid salt, organic carboxylic salt, phenates, and phosphates; alkyl or alkenyl succinate, and other alkyls or alkenyl succinic acid derivatives; sorbitan monooleate, and other partial esters of polyhydric alcohols; oleoyl sarcosine, and other hydroxy fatty acids; 1-mercapto stearic acid, and other mercapto fatty acids or metal salts thereof; stearic acid, and other higher fatty acids; isostearyl alcohol, and other higher alcohols; esters of a higher alcohol and a higher fatty acid; 2,5-dimercapto-1,3, 4-thiadiazole, 2-mercapto thiadiazole, and other diazoles; 2-(decyldithio)-benzoimidazole, benzoimidazole, and other imidazole compounds, or 2,5-bis(dodecyldithio)benzoimidazole and other disulfide compounds, or tris nonylphenyl phosphite and other phosphoric acid esters; dilaurylthiopropionate, and other thiocarboxylic acid ester compounds; and the like. It is also possible to use nitrite, nitrate, chromate, phosphate, molybdate, tungstate, and other corrosion inhibitors for passivizing the metal surface.

Examples of the oily agent that may be used include: oleic acid, stearic acid, and other fatty acids; oleyl alcohol, and other fatty acid alcohols; polyoxyethylene stearic acid ester, polyglyceryl oleic acid ester, and other fatty acid esters; and tricresyl phosphate, and other phosphoric acid esters.

These additives can be added alone or in a combination of two or more. The content of these additives on an individual basis is preferably 0.05 wt % or more of the entire amount of grease, and in the range of 0.15 to 20 wt % as a total of the entire amount of grease. In particular, when the entire amount exceeds 20 wt %, the effect commensurate to the increase in content cannot be expected, the additives may aggregate in the grease, and other undesirable phenomena may occur.

When the constant velocity universal joint of the present invention is applied to a drive shaft for an automobile, it is specifically preferred that grease A described below be used.

[Grease A]

Grease A contains the following components (a) to (f):
(a) a base oil;
(b) a diurea-based thickener;
(c) sulfurized molybdenum dialkyldithiocarbamate;
(d) molybdenum disulfide;
(e) at least one sulfur-phosphorus-based extreme-pressure agent selected from the group consisting of zinc dithiophosphate and thiophosphate; and
(f) a fatty acid amide expressed by $RCONH_2$ (where R represents a $C_{15}$-$C_{17}$ alkyl group).

In the overall composition, the content of the diurea-based thickener is 1 to 25 wt %, the content of the sulfurized molybdenum dialkyldithiocarbamate is 0.1 to 5 wt %, the content of the molybdenum disulfide is 0.1 to 5 wt %, the content of the sulfur-phosphorus-based extreme-pressure agent is 0.1 to 5 wt %, and the content of the fatty acid amide is 0.1 to 5 wt %.

When the constant velocity universal joint of the present invention is applied to a propeller shaft for an automobile, it is specifically preferred that grease B described below be used.

[Grease B]

Grease B contains the following components (a) to (g):
(a) a base oil;
(b) a diurea-based thickener expressed by the following formula: $R^1NH$—$CO$—$NH$—$C_6H_4$-p-$CH_2$—$C_6H_4$-p-$NH$—$CO$—$NHR^2$;
(In the formula, $R^1$ and $R^2$ is a $C_6$-$C_7$ aryl group or cyclohexyl group, and may be the same or different from each other);
(c) sulfurized molybdenum dialkyldithiocarbamate or sulfurized molybdenum dialkyldithiophosphate, or a mixture of the two;
(d) molybdenum disulfide;
(e) zinc dithiophosphate or sulfur-nitrogen-based extreme-pressure agent, or an extreme-pressure agent composed of a mixture of the two;
(f) an extreme-pressure agent that does not contain a phosphorus fraction; and
(g) a sulfur-containing organic tin compound (e.g., one or more sulfur-containing organic tin compounds selected from the group consisting of dimethyl tin bis(isooctylthioglycol), monomethyl tin tris(isooctylthioglycol), and di(n-octyl)tin bis(isooctylmercapto acetate)).

In a boot for a constant velocity universal joint, durability is generally liable to be reduced due to temperature conditions, and additionally due to the effect of these components (base oil and additives) contained in the grease, as well as various other factors. In the constant velocity universal joint of the present invention, the boot is a molded article having the above-described predetermined silicone rubber composition, and the structure thereof is improved as required. It is therefore possible to inhibit the occurrence of cracks even when a grease composed of the components described above is used as the enclosed grease. In particular, grease A and grease B can be used with advantageous effect as noted in the examples described below.

EXAMPLES

Experiment 1

Examples 1 to 5, Comparative Examples 1 to 5

A silicone rubber composition as the boot material was prepared by adding fillers in the amounts (parts by weight) shown in Table 1 with respect to 100 parts by weight of the silicone rubber. The iron oxide in the table is diiron trioxide ($Fe_2O_3$: Bengara red). A millable silicone rubber was used as the silicone rubber, and an organic peroxide cross linking agent was used as the cross linking agent. The silicone rubber and additives (cross linking agent, silica filler, processing aid agent, and the like) other than the additives shown in Table 1 were the same in all the examples 1 to 5 and comparative examples 1 to 5.

This boot material was used to produce a boot having the bellows shown in FIG. 1, the boot was mounted on a sliding-type tripod constant velocity universal joint, which was rotated at an operating angle of 15 degrees, an atmosphere temperature of 140° C., and a speed of 500 rpm for double a predetermined time, and the high-temperature durability was evaluated. The results are shown in Table 1. The test results were obtained by visually confirming the state of the boot, and were evaluated and recorded with the following marks: "⊚" absolutely no cracks, "○" slight amount of cracking observed, and "x" cracking progressed to breaking.

Grease A described above was used as the enclosed grease, which was specifically produced in the following manner. First, 4100 g of the base oil and 1012 g of dipheneylmethane-4,4'-diisocyanate were mixed and heated to 70 to 80° C. Next, 4100 g of the base oil, 563 g of cyclohexylamine, and 225 g of aniline were placed in a separate container, heated to 70 to 80° C., and then added to the first container. The temperature was increased to 160° C. while the mixture was thoroughly stirred, and the mixture was then allowed to cool to obtain a base grease. Mineral oil having a kinematic viscosity of 154 $mm^2/s$ at 40° C. was used as the base oil. Added to the base grease were 3 wt % of sulfurized molybdenum dialkyldithiocarbamate, 1 wt % of molybdenum disulfide, 1 wt % of thiophosphate, and 2 wt % of fatty acid amine, and the resulting mixture was adjusted to a No. 1 grade penetration with a three-stage rolling mill. The addition amounts are wt % with respect to the entire amount of grease.

TABLE 1

| | Example | | | | |
|---|---|---|---|---|---|
| | 1 | 2 | 3 | 4 | 5 |
| Iron oxide | 1 | 2 | 3 | 4 | 3 |
| Titanium oxide | 1 | 2 | 3 | 4 | 3 |
| Barium zirconate | 1 | 2 | 3 | 4 | — |
| Cerium oxide | — | — | — | — | — |
| Experiment results | Slight cracking observed in root of bellows | No cracks | No cracks | No cracks | Slight cracking observed in root of bellows |
| Evaluation | ○ | ⊚ | ⊚ | ⊚ | ○ |

TABLE 1-continued

|  | Comparative example | | | | |
|---|---|---|---|---|---|
|  | 1 | 2 | 3 | 4 | 5 |
| Iron oxide | 5 | — | — | — | — |
| Titanium oxide | — | 5 | — | — | — |
| Barium zirconate | — | — | 5 | — | — |
| Cerium oxide | — | — | — | — | 5 |
| Experiment results | 2nd root breakage less than predetermined time | 2nd root breakage less than predetermined time | 2nd root breakage less than predetermined time | 2nd root breakage less than predetermined time | No cracks |
| Evaluation | X | X | X | X | ◎ |

From these experiment results, it is apparent that examples 2 to 4 did not have cracks after operation for twice the predetermined time, and therefore examples 2 and 3 in which the addition amounts had been reduced are advantageous in terms of cost. In contrast, slight cracking was observed in example 1 because the added amount of filler was low, however, it is thought to be capable of satisfying service specifications. Slight cracking was observed in example 5 because barium zirconate was not added, however, it is thought to be capable of satisfying service specifications.

Experiment 2

Examples 6 to 10, Comparative Examples 6 to 10

A silicone rubber composition as the boot material was prepared by adding fillers in the amounts (parts by weight) shown in Table 2 with respect to 100 parts by weight of the silicone rubber. The iron oxide in the table is diiron trioxide ($Fe_2O_3$: Bengara red). The silicone rubber and additives (cross linking agent, silica filler, processing aid agent, and the like) other than the additives shown in Table 2 were the same in all the examples 6 to 10 and comparative examples 6 to 10 (the same as in example 1).

This boot material was used to produce a boot having the bended part curved in a U-shape shown in FIG. 2, the boot was mounted on a sliding-type cross-groove constant velocity universal joint, which was rotated at an operating angle of 5 degrees, an atmosphere temperature of 150° C., and a speed of 5000 rpm for a predetermined time, and the durability was evaluated. The results are shown in Table 2. The method for evaluating the test results were the same as example 1.

Grease B described above was used as the enclosed grease, which was specifically produced in the following manner. Using the same method as experiment 1 above, only the base oil was switched to a mineral oil having a kinematic viscosity of 141 mm²/s at 40° C. to obtain a base grease. Added to this base grease were 3 wt % of sulfurized molybdenum dialkyldithiocarbamate, 1 wt % of molybdenum disulfide, 2 wt % of zinc dithiophosphate, 2 wt % of an extreme-pressure agent that does not contain a phosphorus fraction, and 1 wt % of a sulfur-containing organic tin compound (a 75/25 (weight ratio) mixture of dimethyl tin bis(isooctylthioglycol) and monomethyl tin tris(isooctylthioglycol)), and the resulting mixture was adjusted to a No. 1 grade penetration with a three-stage rolling mill. The addition amounts are wt % with respect to the entire amount of grease.

TABLE 2

|  | Example | | | | |
|---|---|---|---|---|---|
|  | 6 | 7 | 8 | 9 | 10 |
| Iron oxide | 1 | 2 | 3 | 4 | 3 |
| Titanium oxide | 1 | 2 | 3 | 4 | 3 |
| Barium zirconate | 1 | 2 | 3 | 4 | — |
| Cerium oxide | — | — | — | — | — |
| Experiment results | Slight cracking observed in root of bellows | No cracks | No cracks | No cracks | Slight cracking observed in root of bellows |
| Evaluation | ○ | ◎ | ◎ | ◎ | ○ |

|  | Comparative example | | | | |
|---|---|---|---|---|---|
|  | 6 | 7 | 8 | 9 | 10 |
| Iron oxide | 5 | — | — | — | — |
| Titanium oxide | — | 5 | — | — | — |
| Barium zirconate | — | — | 5 | — | — |
| Cerium oxide | — | — | — | — | 5 |
| Experiment results | Breakage in less than predetermined time | Breakage in less than predetermined time | Breakage in less than predetermined time | Breakage in less than predetermined time | No cracks |
| Evaluation | X | X | X | X | ◎ |

From these experiment results, it is apparent that examples 7 to 9 did not have cracks after operation for the predetermined time, and therefore examples 7 and 8 in which the addition amounts had been reduced are advantageous in terms of cost. In contrast, slight cracking was observed in example 6 because the added amount of filler was low, however, it is thought to be capable of satisfying service specifications. Slight cracking was observed in example 10 because barium zirconate was not added, however, it is thought to be capable of satisfying service specifications.

INDUSTRIAL APPLICABILITY

The constant velocity universal joint of the present invention has excellent durability at high temperatures while using a boot made of silicone rubber that does not include cerium oxide or other rare earth element-containing compounds, and can therefore be advantageously used as a constant velocity universal joint used in a drive shaft for an automobile or a propeller shaft for an automobile.

EXPLANATION OF REFERENCE SYMBOLS AND NUMERALS

1 TJ
2 Outer joint member
3 Groove
4 Tripod member (inside joint member)
5 Journal
6 Spherical roller
7 Needle
8 Shaft
9 Boot
10a, 10b Clamp
11 DOJ
12 Outer joint member
13 Inner race (inner joint member)
14, 15 Groove
16 Ball
17 Cage
18 Shaft
19 Boot
21 LJ
22 Outer joint member
23 Inner joint member
24 Ball
25 Cage
26, 27 Groove
28 Shaft
29 Boot
30 Annular member
31 Clamp
32 Air vent groove

The invention claimed is:

1. A constant velocity universal joint provided with an outer joint member, an inner joint member, a shaft coupled to the inner joint member, and a boot mounted directly or via a separate member to the outer joint member and the shaft, the constant velocity universal joint characterized in that the boot is a molded article of a silicone rubber composition including silicone rubber, iron oxide, titanium oxide, and barium zirconate and not including a rare earth element-containing compound.

2. The constant velocity universal joint of claim 1, characterized in that 0.5 to 5 parts by weight of the iron oxide, the titanium oxide, and the barium zirconate, respectively, are included with respect to 100 parts by weight of the silicone rubber.

3. The constant velocity universal joint of claim 1, characterized in that two to four parts by weight of the iron oxide, the titanium oxide, and the barium zirconate, respectively, are included with respect to 100 parts by weight of the silicone rubber.

4. The constant velocity universal joint of claim 1, characterized in that the silicone rubber is a millable silicone rubber and an organic peroxide cross linking agent is used as a cross linking agent.

5. The constant velocity universal joint of claim 1, characterized in that grease is enclosed in the space sealed by the boot.

6. The constant velocity universal joint of claim 5, characterized in that the grease includes a sulfur-based extreme-pressure agent.

7. The constant velocity universal joint of claim 1, characterized in that the boot comprises a large end side attaching section secured to the outer joint member, a small end side attaching section secured to the shaft, and a bellows having a plurality of peaks and roots disposed between the two attachment parts, the boot having a shape in which the external peripheral surface of the root of the bellows is less curved than the peak.

8. The constant velocity universal joint of claim 7, characterized in that the constant velocity universal joint is a sliding constant velocity universal joint and is used in a drive shaft for an automobile.

9. The constant velocity universal joint of claim 1, characterized in that the boot comprises a large end side attaching section secured to an end part of an annular member coupled to the outer joint member, a small end side attaching section secured to the shaft, and a bellows part having a bending part curved in a U-shape provided between the two attachment parts.

10. The constant velocity universal joint of claim 9, characterized in that the constant velocity universal joint is a sliding constant velocity universal joint and is used in a propeller shaft for an automobile.

* * * * *